United States Patent
Jiang

(10) Patent No.: US 7,650,480 B2
(45) Date of Patent: Jan. 19, 2010

(54) STORAGE SYSTEM AND WRITE DISTRIBUTION METHOD

(75) Inventor: Xiaoming Jiang, Odawara (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 11/510,766

(22) Filed: Aug. 28, 2006

(65) Prior Publication Data

US 2008/0010398 A1    Jan. 10, 2008

(30) Foreign Application Priority Data

Jul. 5, 2006   (JP)   ............................. 2006-185898

(51) Int. Cl.
*G06F 12/00*   (2006.01)
*G06F 13/00*   (2006.01)
*G06F 13/28*   (2006.01)

(52) U.S. Cl. ....................... 711/165; 711/103; 711/113; 365/185.33

(58) Field of Classification Search ................. 711/103, 711/113, 165; 365/185.33
See application file for complete search history.

(56) References Cited

U.S. PATENT DOCUMENTS

| | | | | |
|---|---|---|---|---|
| 5,479,638 A | * | 12/1995 | Assar et al. | ................. 711/103 |
| 5,524,230 A | | 6/1996 | Sakaue et al. | |
| 5,835,935 A | * | 11/1998 | Estakhri et al. | ............. 711/103 |
| 6,850,443 B2 | * | 2/2005 | Lofgren et al. | ......... 365/185.29 |
| 7,139,863 B1 | * | 11/2006 | Defouw et al. | ............... 711/103 |

FOREIGN PATENT DOCUMENTS

JP   5-27924   2/1993

* cited by examiner

*Primary Examiner*—Stephen C Elmore
*Assistant Examiner*—Mark A Giardino, Jr.
(74) *Attorney, Agent, or Firm*—Brundidge & Stanger, P.C.

(57) ABSTRACT

A storage system includes: a flash disk having a plurality of flash memory units; a management table for hierarchically managing the write life of each flash memory unit on a specified storage area basis; and a controller for hierarchically distributing write-processing to the flash memory according to the management table.

14 Claims, 15 Drawing Sheets

FIG.5

| FD | D0 | D1 | D2 | D3 | ... | D9 |
|---|---|---|---|---|---|---|
| ACCESS ATTRIBUTE | R/W | R/W | R/W | R/W | ... | R/W |
| WRITE LIFE | 30% | 20% | 80% | 30% | ... | 0% |
| MIGRATION DESTINATION | | | | | ... | |
| VDEV NUMBER | 1 | 1 | 1 | 1 | ... | 2 |

500

501 FD
502 ACCESS ATTRIBUTE
503 WRITE LIFE
504 MIGRATION DESTINATION
505 VDEV NUMBER

FIG.6

| | D0 | D1 | D2 | D3 | ... | D9 |
|---|---|---|---|---|---|---|
| FD | | | | | | |
| ACCESS ATTRIBUTE | R/W | R/W | R/W* | R/W | ... | R/W |
| WRITE LIFE | 30% | 20% | 80% | 30% | ... | 0% |
| MIGRATION DESTINATION | | | D9 | | | |
| VDEV NUMBER | 1 | 1 | 0 | 1 | ... | 1 |

501 FD
502 ACCESS ATTRIBUTE
503 WRITE LIFE
504 MIGRATION DESTINATION
505 VDEV NUMBER

| FD | D0 | D1 | D2 | D3 | ... | D8 | ... | D11 | D12 |
|---|---|---|---|---|---|---|---|---|---|
| ACCESS ATTRIBUTE | R/W | R/W | R/W* | R/W | | R/W | | R/W | R/W |
| WRITE LIFE | 75% | 70% | 80% | 65% | | 45% | | 40% | 70% |
| MIGRATION DESTINATION | | | D8(A1) D11(A2) | | | | | | |
| VDEV NUMBER | 1 | 1 | 0 | 1 | | 1 | | 1 | 3 |

500

501 — FD
502 — ACCESS ATTRIBUTE
503 — WRITE LIFE
504 — MIGRATION DESTINATION
505 — VDEV NUMBER

FIG.11

| SECTOR | WRITE LIFE | ACCESS ATTRIBUTE | LOGICAL SECTOR | PHYSICAL SECTOR | NUMBER OF CHANGES |
|---|---|---|---|---|---|
| 0 | 52% | R/W | 0 | 0 | 0 |
| 1 | 10% | R/W | 1 | 1 | 0 |
| 2 | 20% | R/W | 2 | 2 | 0 |
| ⋮ | ⋮ | ⋮ | ⋮ | ⋮ | ⋮ |
| n | 0% | R/W | 81290 | 81290 | 0 |
| R | 21% | R/W | 81291 | 81291 | 0 |

FIG.12

| SECTOR | WRITE LIFE | ACCESS ATTRIBUTE | LOGICAL SECTOR | PHYSICAL SECTOR | NUMBER OF CHANGES |
|---|---|---|---|---|---|
| 0 | 0% | R/W | 0 | 81290 | 1 |
| 1 | 10% | R/W | 1 | 1 | 0 |
| 2 | 20% | R/W | 2 | 2 | 0 |
| ⋮ | ⋮ | ⋮ | ⋮ | ⋮ | ⋮ |
| n | 52% | R/W | 81290 | 0 | 1 |
| R | 21% | R/W | 81291 | 81291 | 0 |

FIG. 13

| FM | SECTOR | WRITE LIFE | ACCESS ATTRIBUTE | LOGICAL SECTOR | PHYSICAL SECTOR | NUMBER OF CHANGES |
|---|---|---|---|---|---|---|
| 0 | 0 | 52% | R/W | 0 | 0:0 | 0 |
|   | 1 | 40% | R/W | 1 | 1:0 | 0 |
|   | 2 | 30% | R/W | 2 | 2:0 | 0 |
|   | ⋮ | ⋮ | ⋮ | ⋮ | ⋮ | ⋮ |
|   | n | 32% | R/W | 81920 | 81920:0 | 0 |
|   | R | 40% | R/W | 81921 | 81921:0 | 0 |
| 1 | 0 | 42% | R/W | 81922 | 0:1 | 0 |
|   | 1 | 30% | R/W | 81923 | 1:1 | 0 |
|   | 2 | 10% | R/W | 81924 | 2:1 | 0 |
|   | ⋮ | ⋮ | ⋮ | ⋮ | ⋮ | ⋮ |
|   | n | 0% | R/W | 163842 | 81920:1 | 0 |
|   | R | 38% | R/W | 163843 | 81921:1 | 0 |
| ⋮ | ⋮ | ⋮ | ⋮ | ⋮ | ⋮ | ⋮ |
| N | 0 | 40% | R/W | X | 0:N | 0 |
|   | 1 | 33% | R/W | X+1 | 1:N | 0 |
|   | 2 | 28% | R/W | X+2 | 2:N | 0 |
|   | ⋮ | ⋮ | ⋮ | ⋮ | ⋮ | ⋮ |
|   | n | 21% | R/W | X+N | n:N | 0 |
|   | R | 16% | R/W | X+N+1 | (n+1):N | 0 |

FIG. 14

| FM | SECTOR | WRITE LIFE | ACCESS ATTRIBUTE | LOGICAL SECTOR | PHYSICAL SECTOR | NUMBER OF CHANGES |
|---|---|---|---|---|---|---|
| 0 | 0 | 0% | R/W | 0 | 81920:1 | 1 |
|   | 1 | 40% | R/W | 1 | 1:0 | 0 |
|   | 2 | 30% | R/W | 2 | 2:0 | 0 |
|   | ⋮ | ⋮ | ⋮ | ⋮ | ⋮ | ⋮ |
|   | n | 32% | R/W | 81920 | 81920:0 | 0 |
|   | R | 40% | R/W | 81921 | 81921:0 | 0 |
| 1 | 0 | 42% | R/W | 81922 | 0:1 | 0 |
|   | 1 | 30% | R/W | 81923 | 1:1 | 0 |
|   | 2 | 10% | R/W | 81924 | 2:1 | 0 |
|   | ⋮ | ⋮ | ⋮ | ⋮ | ⋮ | ⋮ |
|   | n | 52% | R/W | 163842 | 0:0 | 1 |
|   | R | 38% | R/W | 163843 | 81921:1 | 0 |
|   | ⋮ | ⋮ | ⋮ | ⋮ | ⋮ | ⋮ |
| N | 0 | 40% | R/W | X | 0:N | 0 |
|   | 1 | 33% | R/W | X+1 | 1:N | 0 |
|   | 2 | 28% | R/W | X+2 | 2:N | 0 |
|   | ⋮ | ⋮ | ⋮ | ⋮ | ⋮ | ⋮ |
|   | n | 21% | R/W | X+N | n:N | 0 |
|   | R | 16% | R/W | X+N+1 | (n+1):N | 0 |

FIG. 15

| Slot | FM | SECTOR | WRITE LIFE | ACCESS ATTRIBUTE | LOGICAL SECTOR | PHYSICAL SECTOR | NUMBER OF CHANGES |
|---|---|---|---|---|---|---|---|
| 0 | 0 | 0 | 52% | R/W | 0 | 0:0:0 | 0 |
|   |   | 1 | 40% | R/W | 1 | 1:0:0 | 0 |
|   |   | ⋮ |   |   |   |   |   |
|   |   | n | 30% | R/W | 81290 | 81290:0:0 | 0 |
|   |   | R | 32% | R/W | 81291 | 81291:0:0 | 0 |
|   | 1 | 0 | 42% | R/W | 81292 | 0:1:0 | 0 |
|   |   | 1 | 14% | R/W | 81293 | 1:1:0 | 0 |
|   |   | ⋮ |   |   |   |   |   |
|   |   | n | 21% | R/W | 163842 | 81290:1:0 | 0 |
|   |   | R | 28% | R/W | 163843 | 81291:1:0 | 0 |
|   | N | 0 | 30% | R/W | X | 0:N:0 | 0 |
|   |   | 1 | 29% | R/W | X+1 | 1:N:0 | 0 |
|   |   | ⋮ |   |   |   |   |   |
|   |   | n | 39% | R/W | X+N | n:N:0 | 0 |
|   |   | R | 45% | R/W | X+N+1 | (n+1):N:0 | 0 |
| ⋮ |   |   |   |   |   |   |   |
| N | 0 | 0 | 31% | R/W | Y | 0:0:N | 0 |
|   |   | 1 | 37% | R/W | Y+1 | 1:0:N | 0 |
|   |   | ⋮ |   |   |   |   |   |
|   |   | n | 24% | R/W | Y+N | 81290:0:N | 0 |
|   |   | R | 15% | R/W | Y+N+1 | 81291:0:N | 0 |
|   | 1 | 0 | 33% | R/W | Y+N+2 | 0:1:N | 0 |
|   |   | 1 | 20% | R/W | Y+N+3 | 1:1:N | 0 |
|   |   | ⋮ |   |   |   |   |   |
|   |   | n | 0% | R/W | Y+2N+3 | 81290:1:N | 0 |
|   |   | R | 25% | R/W | Y+2N+4 | 81291:1:N | 0 |
|   | N | 0 | 26% | R/W | Z | 0:N:N | 0 |
|   |   | 1 | 31% | R/W | Z+1 | 1:N:N | 0 |
|   |   | ⋮ |   |   |   |   |   |
|   |   | n | 40% | R/W | Z+N | n:N:N | 0 |
|   |   | R | 47% | R/W | Z+N+1 | (n+1):N:N | 0 |

FIG.16

| Slot | FM | SECTOR | WRITE LIFE | ACCESS ATTRIBUTE | LOGICAL SECTOR | PHYSICAL SECTOR | NUMBER OF CHANGES |
|---|---|---|---|---|---|---|---|
| 0 | 0 | 0 | 0% | R/W | 0 | 81290:1:N | 1 |
|   |   | 1 | 40% | R/W | 1 | 1:0:0 | 0 |
|   |   | ⋮ |   |   |   |   |   |
|   |   | n | 30% | R/W | 81290 | 81290:0:0 | 0 |
|   |   | R | 32% | R/W | 81291 | 81291:0:0 | 0 |
|   | 1 | 0 | 42% | R/W | 81292 | 0:1:0 | 0 |
|   |   | 1 | 14% | R/W | 81293 | 1:1:0 | 0 |
|   |   | ⋮ |   |   |   |   |   |
|   |   | n | 21% | R/W | 163842 | 81290:1:0 | 0 |
|   |   | R | 28% | R/W | 163843 | 81291:1:0 | 0 |
|   | ⋮ |   |   |   |   |   |   |
|   | N | 0 | 30% | R/W | X | 0:N:0 | 0 |
|   |   | 1 | 29% | R/W | X+1 | 1:N:0 | 0 |
|   |   | ⋮ |   |   |   |   |   |
|   |   | n | 39% | R/W | X+N | n:N:0 | 0 |
|   |   | R | 45% | R/W | X+N+1 | (n+1):N:0 | 0 |
| ⋮ |   |   |   |   |   |   |   |
| N | 0 | 0 | 31% | R/W | Y | 0:0:N | 0 |
|   |   | 1 | 37% | R/W | Y+1 | 1:0:N | 0 |
|   |   | ⋮ |   |   |   |   |   |
|   |   | n | 24% | R/W | Y+N | 81290:0:N | 0 |
|   |   | R | 15% | R/W | Y+N+1 | 81291:0:N | 0 |
|   | 1 | 0 | 33% | R/W | Y+N+2 | 0:1:N | 0 |
|   |   | 1 | 20% | R/W | Y+N+3 | 1:1:N | 0 |
|   |   | ⋮ |   |   |   |   |   |
|   |   | n | 52% | R/W | Y+2N+3 | 0:0:0 | 1 |
|   |   | R | 25% | R/W | Y+2N+4 | 81291:1:N | 0 |
|   | N | 0 | 26% | R/W | Z | 0:N:N | 0 |
|   |   | 1 | 31% | R/W | Z+1 | 1:N:N | 0 |
|   |   | ⋮ |   |   |   |   |   |
|   |   | n | 40% | R/W | Z+N | n:N:N | 0 |
|   |   | R | 47% | R/W | Z+N+1 | (n+1):N:N | 0 |

|  | HDU | | | | | | | | | | | | | | |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| HDD Unit Unit-1 | N | N | N | N | N | N | N | N | N | N | N | N | N | N | N |
| HDD Unit Unit-2 | N | N | N | N | N | N | N | N | N | N | N | N | N | N | N |
| HDD Unit Unit-3 |  |  |  |  |  |  |  |  | N | N | N | N | N | N | N |
| ⋮ |  |  |  |  |  |  |  |  |  |  |  |  |  |  |  |
| HDD Unit Unit-N | N |  |  |  |  |  | R | R |  |  |  |  |  |  | N |
| WRITABLE CAPACITY | 60TB ||||||||||||||
| LIMITED WRITE CAPACITY | 10TB ||||||||||||||
| REMAINING WRITE CAPACITY | 38TB ||||||||||||||
| READ-ONLY CAPACITY | 2TB ||||||||||||||

|  | HDU | | | | | | | | | | | | | | |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| HDD Unit Unit-1 | N | N | N | N | N | N | N | N | N | N | N | N | N | N | N |
| Unit1 HDD0 | WRITE LIFE: Xxxxxx TIMES<br>REMAINING NUMBER OF USES: Xxxxxx USES<br>PREDICTED USABLE PERIOD: 70 DAYS ||||||||||||||

STORAGE SYSTEM AND WRITE DISTRIBUTION METHOD

CROSS-REFERENCES TO RELATED APPLICATIONS

This application relates to and claims priority from Japanese Patent Application No. 2006-185898, filed on Jul. 5, 2006, the entire disclosure of which is incorporated herein by reference.

BACKGROUND

The invention relates to a storage system having flash disks as storage media for storing data, and also to a write distribution method.

JP-A-5-27924 discloses a storage system having flash disks as storage media for storing data. A flash disk is a semiconductor disk device that uses nonvolatile flash memory. Flash memory is composed of blocks, and each of these blocks is composed of pages. A page is a read/write unit and is the same size, 512 bytes, as a sector, which is the minimum read/write unit for a hard disk device such as a magnetic disk device. The general method for rewriting data within a page is to erase old data and then write new data. A block is an erasion unit (generally 16 Kbytes). Even if only pages, which are part of a block, are to be erased, it is still necessary erase the entire block However, a flash disk that uses flash memory having the above-described characteristics has the following limitations: bit errors occur at a certain rate in data stored in flash memory; while data is erased by blocks, the life of each block in terms of the number of times each can be erased, allowing only between 100,000 and 1,000,000 erasions, is short.

It is an object of the invention to balance the write-count in flash memory and extend the useful life of the flash memory. "Balancing" means making the values as close to each other as possible so that no one unit is used excessively when compared to the others.

SUMMARY

In order to achieve the object described above, a storage system according to an aspect of the invention includes: a flash disk having a plurality of flash memory units; a management table for hierarchically managing the write life of each flash memory on a specified storage area basis; and a controller for hierarchically distributing write-processing to the flash memory according to the management table. The write-count in the flash memory can be balanced and the useful life of the flash memory can be extended by hierarchically distributing write-processing to the flash memory.

When the write life of a first storage area, the write destination, exceeds a specified threshold, the controller migrates data in the first storage area to a second storage area whose write life is under the specified threshold, and data originally intended for the first storage area is written to the second storage area. The write life of each storage area can be balanced by writing data intended for the first storage area, which has a large write-count, to the second storage area, which has a small write-count. Write-processing can be distributed without allowing the host computer to recognize the change in the write destination by changing the logical address of the second storage area to the logical address of the first storage area. The first storage area, whose write life has exceeded the specified threshold, can be used, for example, as a storage area for backup data.

The flash memory has a storage area composed of a plurality of sectors. The flash disk has a plurality of slots, each composed of a plurality of flash memory units. The controller distributes, on a sector basis, write-processing to one flash memory unit; and when the write lives for each sector in that one flash memory unit are balanced, the controller then distributes, on a sector basis, write-processing to one slot; and when the write lives of each sector in that one slot are balanced, the controller then distributes, on a sector basis, write-processing to one flash disk. So it can be seen that the controller can hierarchically distribute the write-processing to the flash memory.

According to another aspect of the invention, a storage system includes: a flash disk having a plurality of flash memory units; a management table for hierarchically managing the write life for each flash memory unit on a specified storage area basis; and a controller for changing a flash memory write destination according to the management table. The controller changes the write destination by changing the logical address of the storage area that is the new write destination, to the logical address of the storage area that is the original write destination.

According to the invention, the write-count in flash memory can be balanced and the useful life of the flash memory can be extended.

BRIEF DESCRIPTION OF THE DRAWINGS

FIG. 5 is an explanatory diagram of a flash disk management table.

FIG. 6 is an explanatory diagram of the same flash disk management table.

FIG. 9 is an explanatory diagram of the flash disk management table.

FIG. 11 is an explanatory diagram of a flash memory management table.

FIG. 12 is an explanatory diagram of the same flash memory management table.

FIG. 13 is an explanatory diagram of an intra-slot management table.

FIG. 14 is an explanatory diagram of the intra-slot management table.

FIG. 15 is an explanatory diagram of the intra-slot management table.

FIG. 16 is an explanatory diagram of the intra-slot management table.

FIG. 17 is an explanatory diagram of a flash disk management screen.

FIG. 18 is an explanatory diagram of the same flash disk management screen.

DETAILED DESCRIPTION OF PREFERRED EMBODIMENTS

An embodiment of the invention will be described below with reference to the attached drawings.

Figure 1:
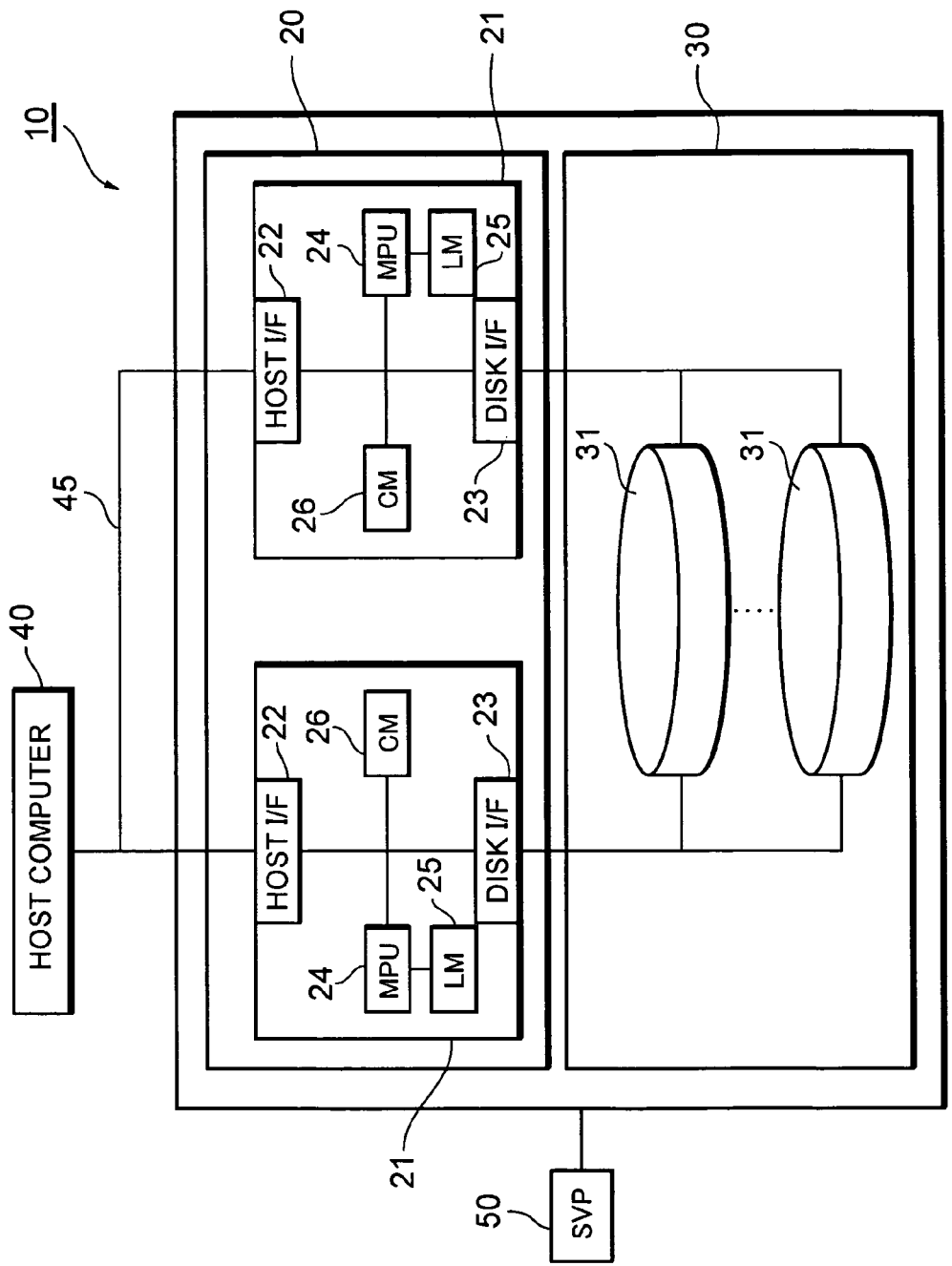
FIG. 1 is a hardware configuration diagram of a storage system according to an embodiment of the invention.

FIG. 1 shows the hardware configuration of a storage system 10 according to an embodiment of the invention. The storage system 10 includes: a storage device 30 for providing a storage resource to a host computer 40; and a storage controller 20 for controlling data input to and output from the storage device 30 in response to data input/output requests from the host computer 40. The storage device 30 has a plurality of flash disks 31.

The host computer 40 is a host system equipped with, for example, a CPU (Central Processing Unit), memory, and an input/output interface. Specific examples of the host computer 40 include a personal computer, a workstation, and a main frame. The storage system 10 is connected via a communication network 45 to the host computer 40. Examples of the communication network 45 include a SAN (Storage Area Network), a LAN (Local Area Network), a WAN (Wide Area Network), a MAN (Metropolitan Area Network), the Internet, a private circuit, and a public circuit.

If the host computer 40 is connected to the storage system 10 via a SAN, the host computer 40 requests data input/output in blocks, which are data management units for the storage resource of the storage system 10, according to protocols such as Fibre Channel Protocol or iSCSI (internet Small Computer System Interface) protocol.

If the host computer 40 is connected to the storage system 10 via a LAN, the host computer 40 requests data input/output in files by designating a file name according to protocols such as those for NFS (Network File System) or CIFS (Common Interface File System).

The storage controller 20 has a plurality of controllers 21. Each controller 21 can control the storage device 30 according to RAID levels (such as 0, 1, 3, 4, 5, and 6) defined by what are called "RAID systems." RAID groups are formed by having, for example, four flash disks 31 as a group (3D+1P), or eight flash disks 31 as a group (7D+1P). In other words, storage areas provided respectively by a plurality of flash disks 31 combine to constitute one RAID group. RAID groups can be also called "parity groups" or "ECC groups." One or more logical volumes that are access units from the host computer 40 are defined in a RAID group. A LUN (Logical Unit Number) is assigned to each logical volume.

Each controller 21 includes a host interface (host I/F) 22, a disk interface (disk I/F) 23, a microprocessor (MPU) 24, cache memory (CM) 25, and local memory (LM) 26.

The host interface 22 is a controller for controlling an interface between the host computer 40 and the controller 20. The host interface 22 has the function of receiving, for example, block access requests according to Fibre Channel Protocol from the host computer 40 and file access requests according to File Transfer Protocol from the host computer 40. The host interface 22 needs to have NAS (Network Attached Storage) functionality in order to process the file access requests from the host computer 40.

The disk interface 23 is a controller for controlling an interface between the storage device 30 and the controller 20. The disk interface 23 has a function that controls data input/output requests to the storage device 30 according to the protocol for controlling the storage device 30.

The microprocessor 24 controls I/O processing (write accesses or read accesses) to the storage device 30 in response to data input/output requests from the host computer 40.

The cache memory 25 is buffer memory for temporarily storing data to be read from or written to the storage device 30. A power backup for the cache memory 25 is provided, and the cache memory 25 is constructed as nonvolatile memory that can prevent loss of cache data even if a power failure occurs in the storage system 10.

The local memory 26 stores, for example, control programs for the microprocessor 24 and a flash disk management table 500 (see FIGS. 5 and 6) described later.

The storage system 10 is connected to a management terminal (SVP) 50. The management terminal 50 is a computer for maintenance and management of the storage system 10. A storage administrator can maintain and manage the storage system 10 by inputting storage administrator commands via a Web browser installed on the management terminal 50. Storage administrator commands include commands for designating additions or erasions regarding the flash disks 31, commands for designating changes in RAID structure, or commands for setting communication paths between the host computer 40 and the storage system 10.

Figure 2:
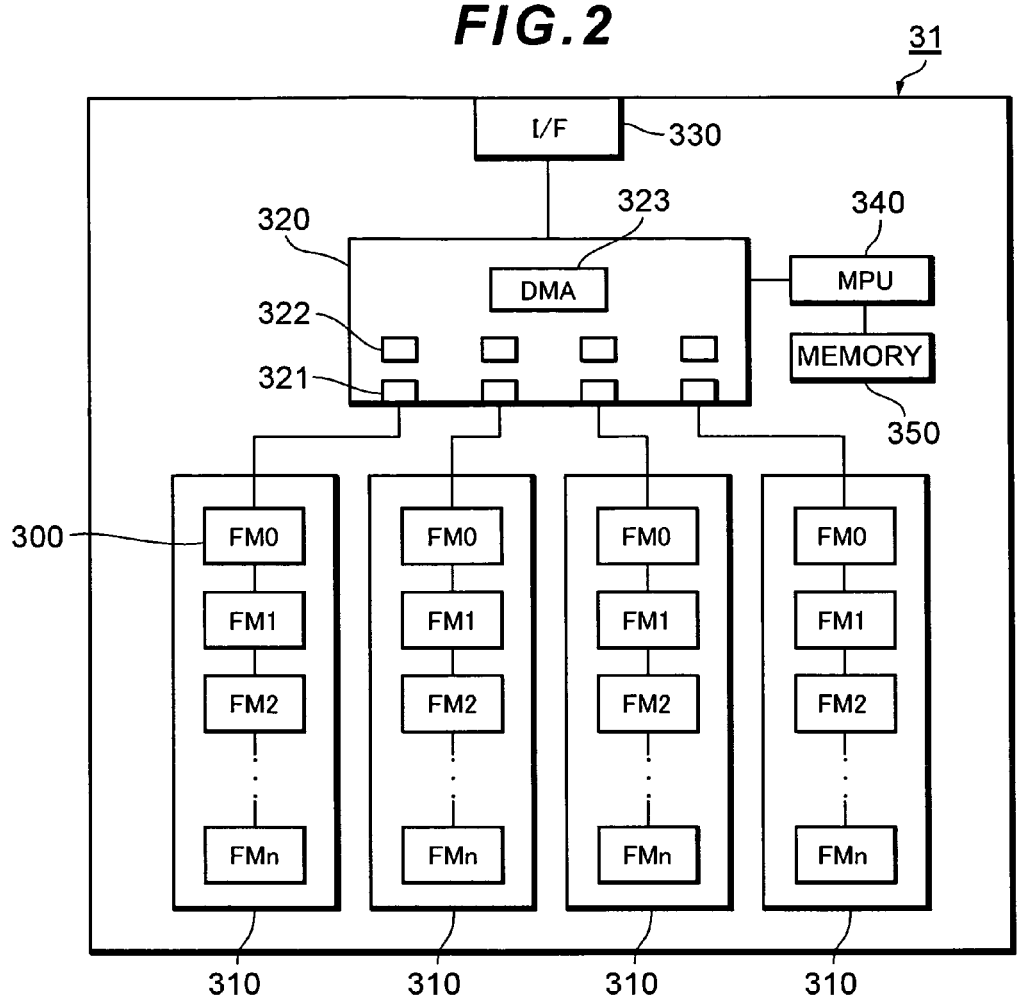
FIG. 2 is a hardware configuration diagram of a flash disk.

FIG. 2 shows the hardware configuration of a flash disk. The flash disk 31 includes: a plurality of flash memory units 300 arranged in arrays; a flash memory controller 320 for controlling data input to and output from the flash memory units 300; an interface 330 for controlling an interface for connection to the controller 20; a microprocessor 340 for controlling the entire flash disk 31; and memory 350 for storing, for example, control programs for the microprocessor 340, a flash memory management table 610, an intra-slot management table 620, and an inter-slot management table 630. The details of the flash memory management table 610, the intra-slot management table 620, and the inter-slot management table 630 will be explained later.

The flash memory controller 320 has: ports 321 for connection to slots 310, each composed of a plurality of flash memory units 300; counters 322 for counting the number of times data is written to each sector in each flash memory unit 300; and a DMA circuit 323 for DMA transfer of data between the interface 330 and each flash memory unit 300. The port 321 identifies a write address and counts the number of times data is written to each sector.

Figure 3:
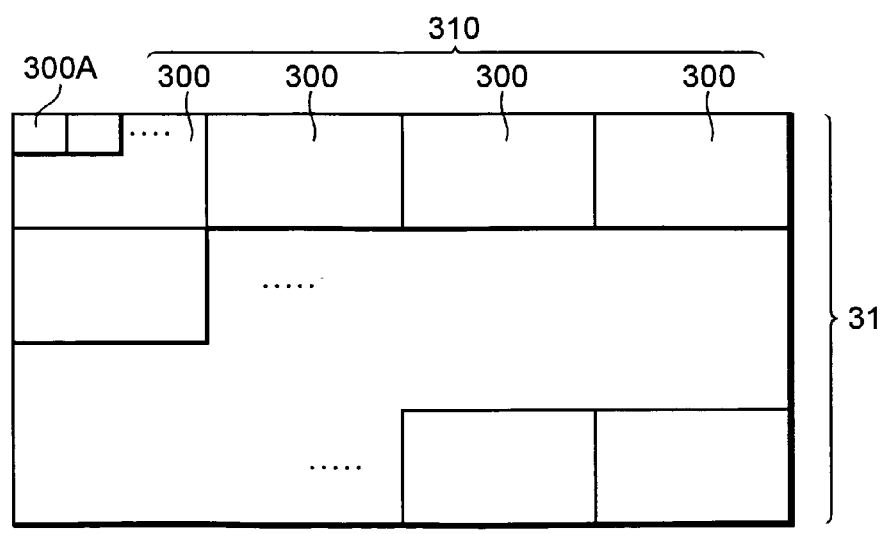
FIG. 3 is an explanatory diagram of a memory space for the flash disk.

FIG. 3 shows memory space for the flash disk 31. As an example, one slot 310 is composed of four flash memory units 300. Assuming that the memory space per flash memory unit 300 is 5 Gbytes, the memory space per slot 310 is 20 Gbytes. Also, the memory space per sector 300A may be set to, for example, 64 Kbytes. Each sector 300A is a data write/read unit for the flash memory unit 300.

Next, processing for distributing write-processing to each flash disk D0 to D9 will be described below with reference to FIGS. 4 to 6. Different numerals are given to the flash disks D0 to D9 for the sake of convenience in order to differentiate between them. However, the internal structure of each flash disk D0 to D9 is the same as that of the flash disk 31 shown in FIG. 2.

Figure 4:
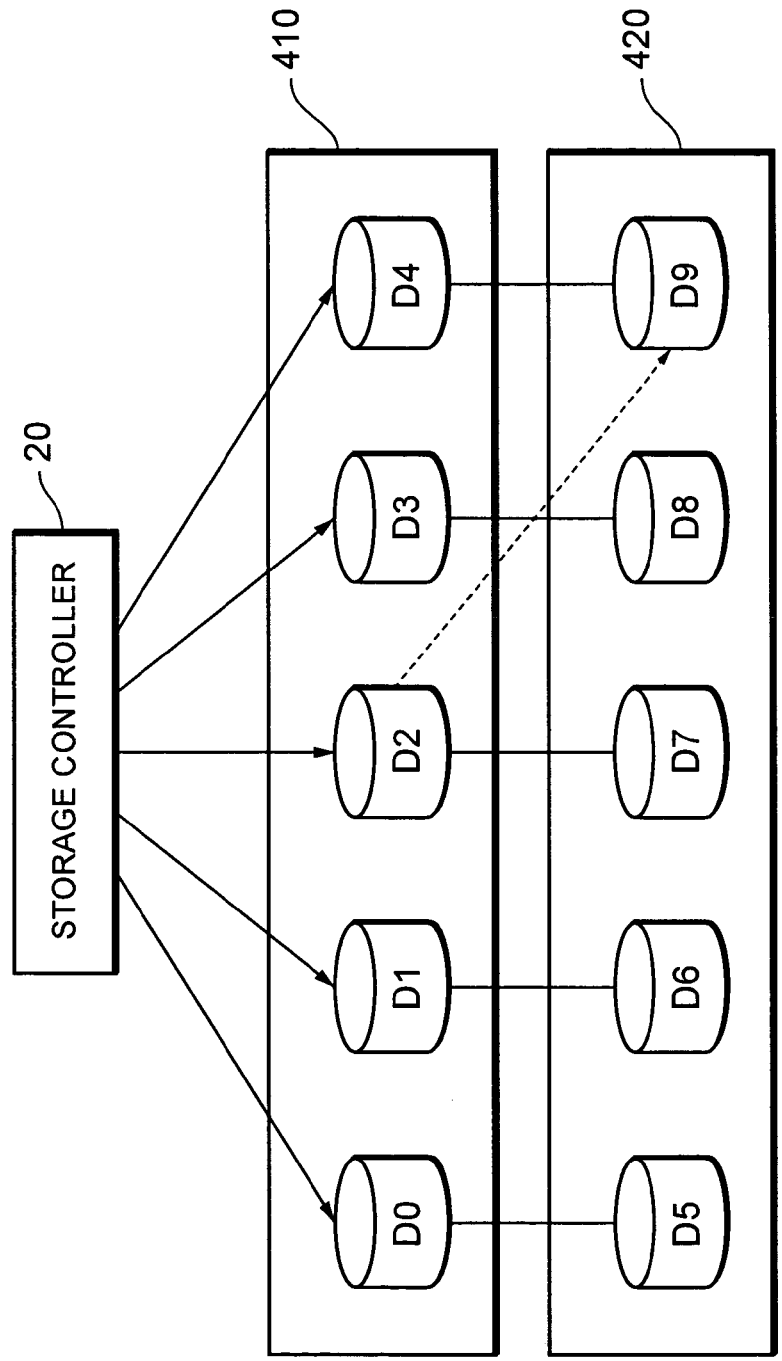
FIG. 4 is an explanatory diagram showing processing for distributing write-processing to flash disks.

As shown in FIG. 4, the flash disks D0 to D4 belong to a RAID group 410 of RAID level "5," having a (4D+1P) drive configuration, and the flash disks D5 to D9 belong to a RAID group 420 of RAID level "3," having a (3D+1P) drive configuration. The flash disk D9 is an empty spare disk. The RAID group 410 provides a storage area of a logical unit (LU0) to the host computer 40, and the RAID group 420 provides a storage area of a logical unit (LU1) to the host computer 40.

The storage controller 20 contains the flash disk management table 500. The flash disk management table 500 is used to store management information about each flash disk. As shown in FIG. 5, the flash disk management table 500 associates an FD identifier 501, access attribute 502, write life 503, migration destination 504, and VDEV number 505. The FD identifier 501 is information for identifying each flash disk. The access attribute 502 is information indicating, for example, "Readable/Writable," "Read Only," and "Cannot Read/Write." The write life 503 indicates the ratio of the number of times data has been written to the relevant flash disk to the number of times data write is possible in its useful life (the maximum number of times data can be written to the relevant flash disk). The migration destination 504 indicates the identifier for a flash disk, the migration destination; and when the write life of a certain flash disk exceeds a specified threshold, data written in that flash disk should be migrated to another flash disk, the migration destination. The VDEV number 505 indicates the RAID group number to which the relevant flash disk belongs. For example, the VDEV number for flash disks belonging to the RAID group 410 is "1," and the VDEV number for flash disks belonging to the RAID group 420 is "2." The VDEV number for flash disks belonging to a write-limited RAID group is "0."

The processing executed by the storage controller 20 for distributing write-processing to the flash disks D0 to D9 is as follows:

(1) When the storage controller 20 receives a write access request to access the logical unit (LU0) from the host computer 40, the storage controller 20 refers to the flash disk management table 500 and checks which flash disk(s) from among the plurality of flash disks D0 to D4 constituting the logical unit (LU0) has a write life above a specified threshold (for example, 80%).

(2) In the example shown in FIG. 5, the write life of the flash disk D2 is above the specified threshold. Accordingly, the storage controller 20 detects that the write life of the flash disk D2 is above the specified threshold.

(3) The storage controller 20 searches the storage device 30 for a flash disk to which data has been written a small number of times. In the example shown in FIG. 4, it is assumed that the flash disk D9 is an empty disk (spare disk). Therefore, the controller 20 selects the flash disk D9 as the migration destination disk for the flash disk D2 (migration source disk from which data should be migrated). Regarding priority in selecting the migration destination disk, an empty disk like a spare disk should be given the highest priority; and if there is no such empty disk, preferably a flash disk belonging to the same RAID group as the migration source disk and to which data has been written a small number of times should be selected.

(4) The storage controller 20 migrates the data in the flash disk D2 to the flash disk D9.

(5) The storage controller 20 updates the flash disk management table 500 so that the flash disk D9 is indicated as the migration destination for the flash disk D2. As a result of this table update, data that should be written to the flash disk D2 will be written to the flash disk D9 from that point in time onwards.

(6) The storage controller 20 updates the access attribute of the flash disk D2 to "write-limited."

"Write-limited" means use with a limited number of times data can be written and includes, for example, use as a snapshot volume for holding a snapshot of a certain volume, use as a secondary volume for holding a replica of a certain primary volume, or use as a backup volume. As backup use, for example, use as a WORM area to which data can be written only once and from which data can be read many times (archive use—for example, for storage of e-mails) is possible.

FIG. 6 shows the flash disk management table 500 that has been updated as described above. The access attribute of the flash disk D2 is updated from "R/W" to "R/W*." "R/W*" indicates that the relevant flash disk is write-limited. Also, the identifier for the flash disk D9 is registered as the migration destination for the flash disk D2, and the VDEV number for the flash disk D2 is updated from "1" to "0." Moreover, the VDEV number for the flash disk D9 is updated from "2" to "1." As a result of these table updates, the table indicates that the migration destination for data in the flash disk D2 is the flash disk D9, and the flash disk D2 belongs to the write-limited RAID group. The table also indicates that the RAID group to which the flash disk D9 belongs has changed from the RAID group 420 to the RAID group 410.

If none of the flash disks D0 to D4, which constitute the logical unit (LU0), has a write life exceeding the specified threshold value, the storage controller 20 makes normal write access to each flash disk D0 to D4.

Next, processing for distributing write-processing to each flash disk D0 to D12 will be described below with reference to FIGS. 7 to 9. Different numerals are given to the flash disks D0 to D12 for the sake of convenience in order to differentiate between them. However, the internal structure of each flash disk D0 to D12 is the same as that of the flash disk 31 shown in FIG. 2.

Figure 7:
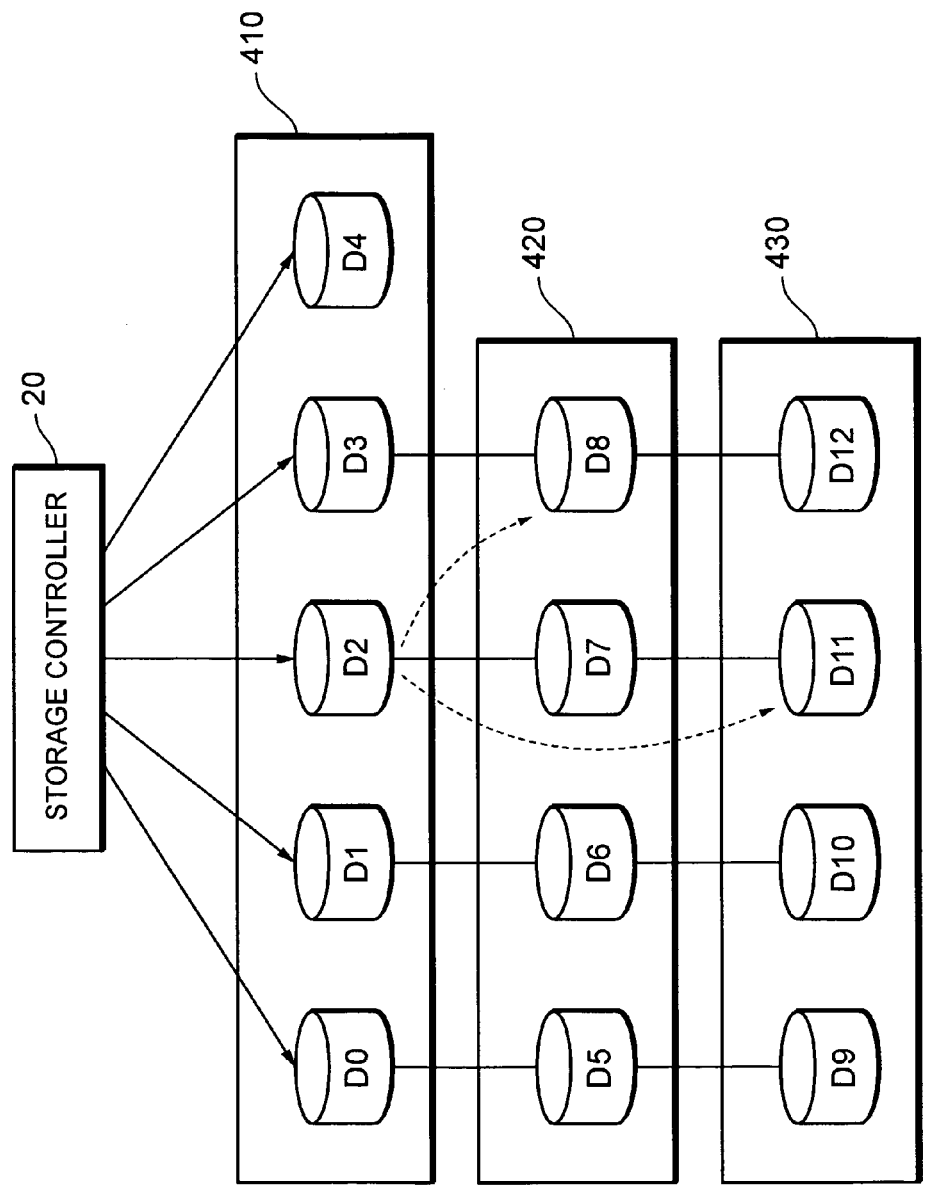
FIG. 7 is an explanatory diagram showing processing for distributing write-processing to flash disks.

As shown in FIG. 7, the flash disks D0 to D4 belong to the RAID group 410 of RAID level "5," which has a (4D+1P) drive configuration, and the flash disks D5 to D8 belong to the RAID group 420 of RAID level "3," which has a (3D+1P) drive configuration, and the flash disks D9 to D12 belong to a RAID group 430 of RAID level "5," which has a (3D+1P) drive configuration. The RAID groups 410, 420, and 430 provide logical units (LU0), (LU1), and (LU2) respectively, and their VDEV numbers are "1," "2," and "3" respectively.

The processing executed by the storage controller 20 for distributing write-processing to the flash disks D0 to D12 is as follows:

(1) When the storage controller 20 receives a write access request to access the logical unit (LU0) from the host computer 40, the storage controller 20 refers to the flash disk management table 500 and checks which flash disk from among the plurality of flash disks D0 to D4 constituting the logical unit (LU0) has a write life above a specified threshold (for example, 80%).

(2) In the example shown in FIG. 5, the write life of the flash disk D2 is above the specified threshold, and so the storage controller 20 detects that the write life of the flash disk D2 is above the specified threshold.

(3) The storage controller 20 searches the storage device 30 for a flash disk to which data has been written a small number of times. In the example shown in FIG. 7, it is assumed that there is no flash disk having enough empty capacity to store all data in the flash disk D2. Therefore, the controller 20 selects a plurality of flash disks as the migration destination disks for the flash disk D2. Preferably, the flash disks that have as much empty capacity as possible and to which data has been written a small number of times should be selected as the migration destinations. In this example, the storage controller 20 selects the flash disks D8 and D11 as the migration destinations for the flash disk D2.

Figure 8:
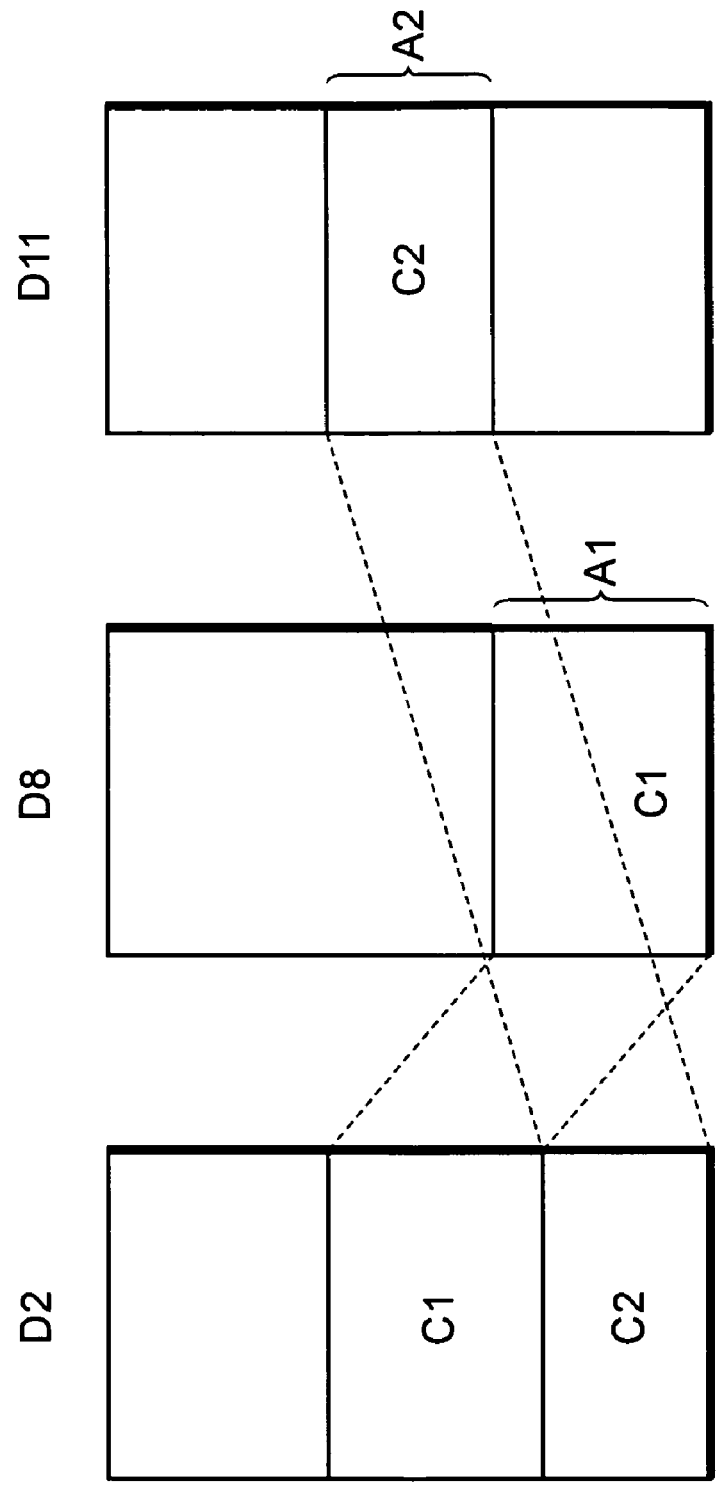
FIG. 8 is an explanatory diagram showing the relationship between the flash disks.

(4) As shown in FIG. 8, the storage controller 20 migrates some of the data C1 in the flash disk D2 to an address range A1 in the flash disk D8, and the remaining data C2 in the flash disk D2 to an address range A2 in the flash disk D11.

(5) The storage controller 20 updates the flash disk management table 500 so that the flash disks D8 and D11 are indicated as the migration destinations for the flash disk D2. As a result of this table update, data that should be written to the flash disk D2 will be written to the flash disks D8 and D11 from that point in time onwards.

(6) The storage controller 20 updates the access attribute of the flash disk D2 to "write-limited."

FIG. 9 shows the flash disk management table 500 that has been updated as described above. The access attribute of the flash disk D2 is updated from "R/W" to "R/W*." Also, the identifier and the address range A1 in the flash disk D8 and the identifier and the address range A2 in the flash disk D11 are registered respectively as the migration destinations for the flash disk D2. The VDEV number for the flash disk D2 is updated from "1" to "0." Also, the VDEV number for the flash disk D8 is updated from "2" to "1," and the VDEV number for the flash disk D11 is updated from "3" to "1." As a result of these table updates, the table shows that the migration destinations for the data in the flash disk D2 are the flash disks D8 and D1, and the flash disk D2 belongs to the write-limited RAID group. The table also shows that the RAID group to which the address range A1 in the flash disk D8 belongs has changed from the RAID group 420 to the RAID group 410, and the RAID group to which the address range A2 in the flash disk D11 belongs has changed from the RAID group 430 to the RAID group 410.

Now, a parity update method will be described below for the case where some of the data C1 in the flash disk D2 is migrated to the address range A1 in the flash disk D8, and the remaining data C2 is migrated to the address range A2 in the flash disk D11. When the data C1 in the flash disk D2 is updated, the storage controller 20 updates the parity of the RAID group 410 to a new value. The storage controller 20 also writes the update data to the address range A1 of the flash disk D8 and updates the parity of the RAID group 420. If the flash disk D1 is updated and it is thereby necessary to update the parity of the data C1 or C2 in the flash disk D2, the storage controller 20 updates the parity of the data C1 or C2 in the flash disk D2 and also updates the parity of the address range A1 in the flash disk D8 or the parity of the address range A2 in the flash disk D11.

An example of distribution of write-processing within flash disks will be described below with reference to FIGS. 10 to 16. The distribution of write-processing within flash disks is performed hierarchically in a plurality of steps. In the first step, write-processing is distributed in a flash memory unit 300. In the first distribution processing step, the write lives of each sector in the flash memory unit 300 are managed using the flash memory management table 610 (see FIGS. 11 and 12); and write-processing to the flash memory unit 300 is distributed equally among the sectors by migrating data in a sector whose write life has exceeded a specified threshold, to another sector (to which data has been written a small number of times).

If the number of times data has been written to each sector in the flash memory unit 300 indicates that almost all sectors are close to the end of their write lives, the write-processing cannot be distributed completely only by the first distribution processing step. In this case, the write-processing will be distributed within a slot 310. This is a second distribution processing step. In the second distribution processing step, the write lives of each sector in the slot 310 are managed, using the intra-slot management table 620 (see FIGS. 13 and 14); and write-processing to the slot 310 is distributed equally among the sectors by migrating data in a sector whose write life has exceeded a specified threshold to another sector (to which data has been written a small number of times).

If the number of times data has been written to each sector in the slot 310 indicates that almost all sectors are close to the end of their write lives, the write-processing cannot be distributed completely only by the second distribution processing step. In this case, the write-processing will be distributed between the slots 310. This is a third distribution processing step. In the third distribution processing step, the write lives of each sector in the slots 310 are managed, using the inter-slot management table 630 (see FIGS. 15 and 16); and the write-processing to the slots 310 is distributed equally among the sectors in the slots 310 by migrating data in a sector whose write life has exceeded a specified threshold to another sector (to which data has been written a small number of times).

The number of times data is written to each sector in the flash disks 31 can be generally balanced by hierarchically distributing write-processing in the steps described above.

Figure 10:
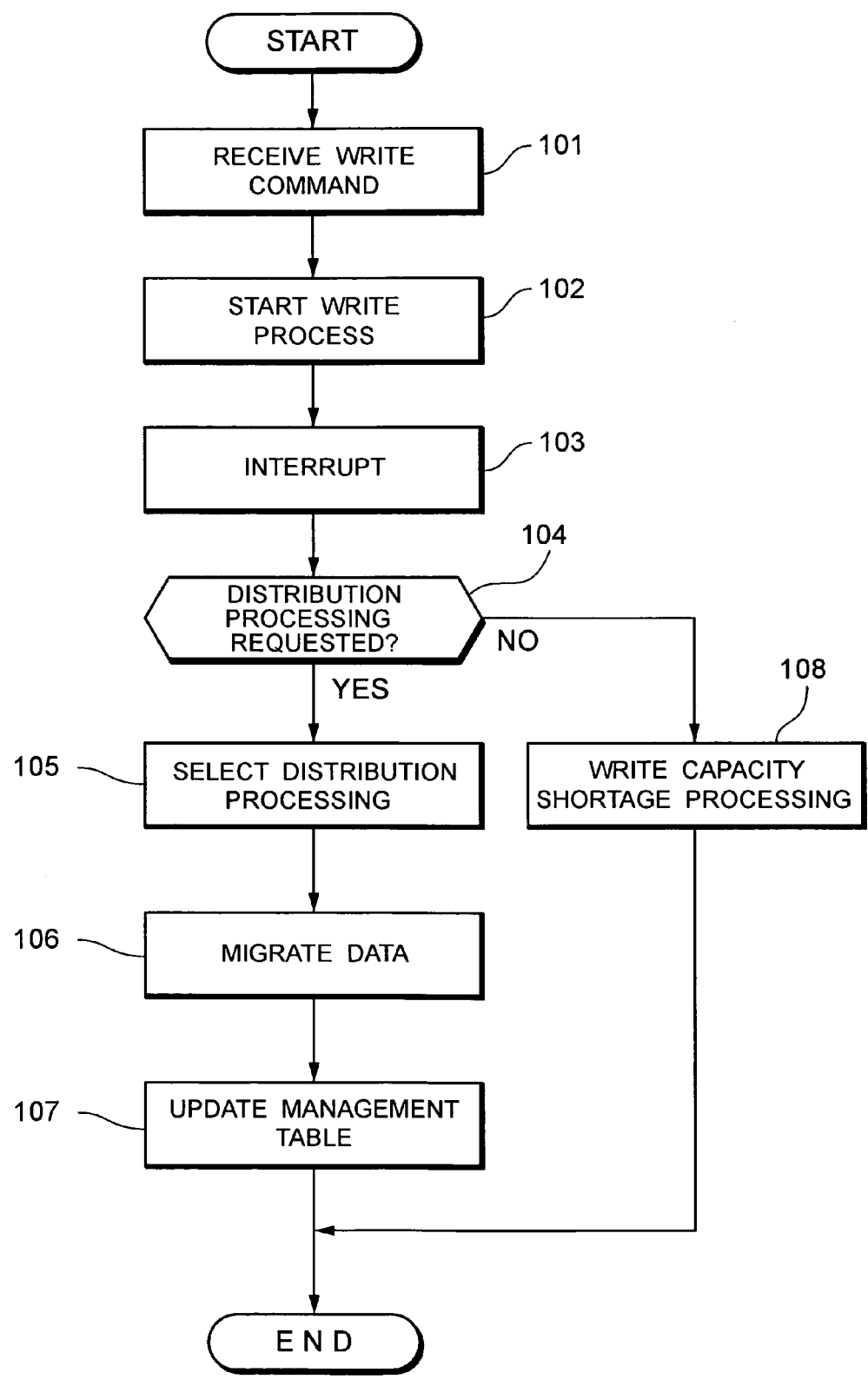
FIG. 10 is a flowchart showing write distribution processing.

FIG. 10 is a flowchart showing the processing executed by the microprocessor 340 for distributing write-processing to the flash disk 31. When the microprocessor 340 receives a write command from the storage controller 20 (step 101), the microprocessor 340 starts write-processing to the write address contained in the write command (step 102).

If the write life of a write target sector exceeds a specified threshold, the flash memory controller 320 interrupts (step 103). If this interruption is a distribution processing request (step 104: YES), the microprocessor 340 selects either write distribution processing in the flash memory unit 300, write distribution processing in the slot 310, or write distribution processing between the slots 310, depending on how much data has been written to each sector of the flash disks 31 (step 105).

The microprocessor 340 then migrates data from the migration source sector to the migration destination sector (step 106) and updates the flash memory management table 610, the intra-slot management table 620, or the inter-slot management table 630 (step 107).

On the other hand, if the interruption is not a distribution processing request (step 104: NO), the microprocessor 340 performs processing for dealing with a write capacity shortage (processing such as reporting a write error or setting the access attribute to "write-limited").

Next, processing for updating the flash memory management table 610 in association with the write distribution processing in the flash memory unit 300 will be described below with reference to FIGS. 11 and 12.

The flash memory management table 610 is used to store management information in the flash memory unit 300 and associates a sector identifier 601, write life 602, access attribute 603, logical sector 604, physical sector 605, and number of changes 606. The sector identifier 601 is information identifying each sector. The write life 602 indicates the ratio of the number of times data has been written to the relevant sector to the number of times data write is possible in its useful life (the maximum number of times data can be written to the relevant sector). The access attribute 603 is information indicating, for example, "Readable/Writable," "Read Only," and "Cannot Read/Write." The logical sector 604 indicates the logical number for the relevant sector. The physical sector 605 indicates the physical number for the relevant sector. The number of changes 606 indicates the number for changes of the relevant sector's logical number.

The microprocessor 340 checks whether or not the write lives of each sector in the flash memory unit 300 are above a specified threshold (for example, 50%), by referring to the flash memory management table 610. In the example shown in FIG. 11, the write life of sector 0 is above the specified threshold, and the microprocessor 340 searches for a sector whose write life is under a specified threshold (for example, 30%), by referring to the flash memory management table 610. In the example shown in FIG. 11, the write life of sector n is 0% and, therefore, the microprocessor 340 selects sector n as the migration destination sector. Subsequently, the microprocessor 340 migrates data from the migration source sector (sector 0) to the migration destination sector (sector n)

and exchanges their logical numbers. Also, the microprocessor 340 increments the number of changes for the migration source sector (sector 0) and the migration destination sector (sector n) respectively by one. As a result of the processing described above, the flash memory management table 610 is updated as shown in FIG. 12.

Incidentally, sector R is a redundancy sector prepared in case of a shortage of write capacity. If none of sectors 0 to n can be the migration destination, sector R may be selected as the migration destination sector.

Next, processing for updating the intra-slot management table 620 in association with the write distribution processing in the slot 310 will be described below with reference to FIGS. 13 and 14.

The intra-slot management table 620 is used to store management information in the slot 310 and associates a sector identifier 601, write life 602, access attribute 603, logical sector 604, physical sector 605, number of changes 606, and flash memory identifier 607. The flash memory identifier 607 is the information identifying each flash memory unit 300.

The microprocessor 340 checks whether or not the write lives of each sector in the slot 310 are above a specified threshold (for example, 50%), by referring to the intra-slot management table 620. In the example shown in FIG. 13, the write life of sector 0 in the flash memory 0 is above the specified threshold, and the microprocessor 340 searches for a sector whose write life is under a specified threshold (for example, 30%), by referring to the intra-slot management table 620. In the example shown in FIG. 13, the write life of sector n in the flash memory 1 is 0% and, therefore, the microprocessor 340 selects sector n in the flash memory 1 as the migration destination sector. Subsequently, the microprocessor 340 migrates data from the migration source sector (sector 0 in the flash memory 0) to the migration destination sector (sector n in the flash memory 1) and exchanges their logical numbers. Also, the microprocessor 340 increments the number of changes for the migration source sector (sector 0 in the flash memory 0) and the migration destination sector (sector n in the flash memory 1) respectively by one. As a result of the processing described above, the intra-slot management table 620 is updated as shown in FIG. 14.

Next, processing for updating the inter-slot management table 630 in association with the write distribution processing between the slots 310 will be described below with reference to FIGS. 15 and 16.

The inter-slot management table 630 is used to store management information between the slots 310 and associates a sector identifier 601, write life 602, access attribute 603, logical sector 604, physical sector 605, number of changes 606, flash memory identifier 607, and slot identifier 608. The slot identifier 608 is the information to identify each slot 310.

The microprocessor 340 checks whether or not the write lives of each sector in the different slots 310 are above a specified threshold (for example, 50%), by referring to the inter-slot management table 630. In the example shown in FIG. 15, the write life of sector 0 of the flash memory 0 of slot 0 is above the specified threshold, and the microprocessor 340 searches for a sector whose write life is under a specified threshold (for example, 30%), by referring to the inter-slot management table 630. In the example shown in FIG. 15, the write life of sector n in the flash memory 1 in slot N is 0% and, therefore, the microprocessor 340 selects sector n in the flash memory 1 in slot N as the migration destination sector. Subsequently, the microprocessor 340 migrates data from the migration source sector (sector 0 in the flash memory 0 in slot 0) to the migration destination sector (sector n in the flash memory 1 in slot N) and exchanges their logical numbers. Also, the microprocessor 340 increments the number of changes for the migration source sector (sector 0 in the flash memory 0 in slot 0) and the migration destination sector (sector n in the flash memory 1 in slot N) respectively by one. As a result of the processing described above, the inter-slot management table 630 is updated as shown in FIG. 16.

Since one slot 310 can be recognized as one logical storage area by the host computer 40, the flash memory units 300 in the flash disk 31 can be exchanged on a slot basis. In the system of exchanging the flash memory units 300 on a slot basis, the flash memory controller 320 needs a means for finding out the number of times data has been written to the flash memory units 300 in the slot 310 newly mounted on the flash disk 31. As such a means, for example, each flash memory unit 300 in the slot 310 may store the number of times data has been written to its own flash memory unit 300, or nonvolatile memory in the slot 310 may be used to store the number of times data has been written to the flash memory units 300, so that the flash memory controller 320 can read the number of times data has been written to each flash memory unit 300 when a new slot 310 is mounted on the flash disk 31.

When the flash memory units 300 are exchanged on a slot basis, there is the possibility that there may be variations between the different slots in the number of times data has been written to the flash memory units 300. Such variations may be solved and the write-count in the flash memory units 300 can be balanced among the slots by performing write distribution processing between the slots.

It is also possible that the write lives of a number of storage areas (storage units such as slots, flash memory units, or sectors) in the entire storage device 30 may be above a specified threshold at almost the same time. In that case, it is preferable that data in a storage area whose write life has exceeded the specified threshold earlier be migrated first, and then data in a storage area whose write life has exceeded the specified threshold later be migrated second.

Next, a management screen displayed on the management terminal 50 will be described below with reference to FIGS. 17 and 18. FIG. 17 shows the management screen for the flash disks 31. This management screen displays the access attributes and capacities (such as writable capacity, limited write capacity, remaining write capacity, and read-only capacity) of the flash disks 31. In FIG. 17, "N" stands for a flash disk in a normal state, "L" stands for a write-limited flash disk, "S" stands for a spare flash disk, "F" stands for a flash disk in which a failure has occurred, and "R" stands for a flash disk whose access attribute is set to read-only. When a storage administrator selects any of the flash disks 31 on the management screen, the following information is displayed: the write life, remaining number of uses, predicted usable period, and other information for the selected flash disk 31.

Since the number of times data is written to the flash memory units can be hierarchically balanced according to this embodiment, the useful life of the flash disks can be extended. An example of the write distribution processing on a sector basis has also been described in this embodiment. However, the write-processing may be distributed on the basis of a storage capacity larger than or smaller than a sector unit.

What is claimed is:

1. A storage system comprising:
a plurality of flash disks, each having a plurality of slots, wherein each of the slots comprises a plurality of flash memory units, and
wherein each of the flash memory units comprises a plurality of sectors;
a management table for hierarchically managing a write life of each flash memory unit on a sector basis; and
a controller for hierarchically distributing write-processing to the flash memory units according to the management table,
wherein the controller is a RAID (Redundant Array of Independent Disks) controller, wherein the controller distributes, on a sector basis, write-processing to one flash memory unit, wherein when the write lives for each sector in that one flash memory unit are balanced, the controller then distributes, on a sector basis, write-processing to one slot, wherein when the write lives for each sector in that one slot are balanced, the controller then distributes, on a sector basis, write-processing to one flash disk, wherein when the write life of a write destination, which is a first flash disk of a plurality of flash disks, exceeds a specified threshold, the controller migrates data in the first flash disk to a migration destination, which is a second flash disk of the plurality of flash disks whose write life is less than the specified threshold, and the controller writes data that was originally intended for the first flash disk to the second flash disk, and wherein the controller selects the second flash disk as the migration destination based on priority, an empty disk being given a highest priority, and when there is no empty disk, the priority is given to a disk belonging to the same RAID group as the first flash disk and to which data has been written a small number of times.

2. The storage system according to claim 1, wherein when the write life of the first flash disk has exceeded the specified threshold, the first flash disk is used to store back-up data.

3. The storage system according to claim 1, wherein, when the write life of the first flash disk has exceeded the specified threshold, the first flash disk is used as a volume to store data for which the write-count is limited.

4. The storage system according to claim 3, wherein the volume is selected from the group consisting of a snapshot volume for storing a snapshot of a certain volume, a secondary volume for storing a replica of a certain primary volume, and a backup volume.

5. The storage system according to claim 1, wherein the controller changes the write destination by changing the logical address of the flash disk that is the new write destination, to the logical address of the flash disk that is the original write destination.

6. The storage system according to claim 1, wherein when there is no flash disk of the plurality of flash disks having enough empty capacity to store all the data from the first flash disk, the controller selects a plurality of second flash disks as the migration destination.

7. The storage system according to claim 1, wherein when the write life of the first flash disk has exceeded the specified threshold, the controller updates the management table to indicate that the first flash disk is used to store data for which the write-count is limited.

8. The storage system according to claim 1, wherein the flash memory units can be exchanged on a slot basis.

9. The storage system according to claim 1, wherein the storage system is connected to a management terminal having a display, which displays access attributes and capacities for each of the plurality of flash disks, and wherein when a user selects any one of the plurality of flash disks on the display, the write life, a remaining number of uses, and a predictable usable period for the selected any one of the plurality of flash disks are displayed.

10. A write distribution method in a storage system including a plurality of flash disks, the method comprising the steps of:

hierarchically managing, by a management table, on a specified storage area basis, a write life of each of a plurality of flash memory units in each flash disk of the plurality of flash disks, each flash disk having a plurality of slots, wherein each of the slots comprises the plurality of flash memory units, and wherein each of the flash memory units comprises a plurality of sectors; and hierarchically distributing write-processing to the flash memory units according to the management table, wherein the controller is a RAID (Redundant Array of Independent Disks) controller, wherein the step of hierarchically distributing the write-processing includes a step of distributing, on a sector basis, write-processing to one flash memory unit;

then distributing, on a sector basis, write-processing to one slot when the write lives for each sector in that one flash memory unit are balanced; and then distributing, on a sector basis, write-processing to one flash disk when the write lives for each sector in that one slot are balanced, wherein the step of hierarchically distributing the write-processing includes a step of:

when the write life of a write destination, which is a first flash disk of a plurality of flash disks, exceeds a specified threshold, migrating data in the first flash disk to a migration destination, which is a second flash disk of the plurality of flash disks whose write life is less than the specified threshold, and writing data that was originally intended for the first flash disk to the second flash disk; and selecting the second flash disk as the migration destination based on priority, an empty disk being given a highest priority, and when there is no empty disk, the priority is given to a disk belonging to the same RAID group as the first flash disk and to which data has been written a small number of times.

11. The write distribution method according to claim 10, wherein when the write life of the first flash disk has exceeded the specified threshold, the first flash disk is used as a storage area for back-up data.

12. The write distribution method according to claim 10, wherein when the write life of the first flash disk has exceeded the specified threshold, the first flash disk is used as a volume to store data for which the write-count is limited.

13. The write distribution method according to claim 10, wherein the step of hierarchically distributing the write-processing includes a step of changing a flash memory write destination.

14. The write distribution method according to claim 13, wherein the step of hierarchically distributing the write-processing includes a step of changing the write destination by changing the logical address of the flash disk that is the new write destination, to the logical address of the flash disk that is the original write destination.

* * * * *